INVENTORS
Friedrich Georg Lippe
Julius Otto Roeder
BY
Michael J. Striker

Nov. 16, 1965    F. G. LIPPE ETAL    3,218,188
PROCESS FOR PRODUCING SUGAR FROM SUGAR-CONTAINING
VEGETABLE MATERIAL
Filed Jan. 28, 1964    4 Sheets-Sheet 3

INVENTORS
Friedrich Georg Lippe
Julius Otto Roeder
BY
Michael S. Striker

Nov. 16, 1965   F. G. LIPPE ETAL   3,218,188
PROCESS FOR PRODUCING SUGAR FROM SUGAR-CONTAINING
VEGETABLE MATERIAL
Filed Jan. 28, 1964   4 Sheets-Sheet 4

INVENTORS
Friedrich Georg Lippe
Julius Otto Roeder
BY
Michael S. Striker
Atty 3,218,188
PROCESS FOR PRODUCING SUGAR FROM SUGAR-CONTAINING VEGETABLE MATERIAL
Friedrich Georg Lippe, Frankfurt am Main, and Julius-Otto Roeder, Wiesbaden, Germany, assignors to Defon Aktiengesellschaft, Vaduz, Liechtenstein
Filed Jan. 28, 1964, Ser. No. 340,756
Claims priority, application Germany, July 20, 1963, R 35,730
11 Claims. (Cl. 127—43)

The present invention relates to the recovery of sugar from vegetable material containing the same. In its broadest aspects, the present invention as well as my copending application Serial No. 237,960 is also concerned with a process for separating liquid-soluble cell content from cellular vegetable material. The present invention is also concerned with an apparatus adapted for the recovery of liquid-soluble cell content, particularly for the recovery of sugar from sugar-containing vegetable cells.

A variety of processes are known for producing or recovering sugar from sugar-containing plants or vegetable material. All of these conventional methods have in common that the recovery of the sugar is connected with applying heat to the raw or intermediate material. The disadvantages of conventional methods of sugar recovery include high energy requirements, very considerable initial costs for the equipment used in these processes and, furthermore, the caramelization, or discoloration, or browning of the molasses formed as a residual product and also of the raw sugar. Thus, the raw sugar produced by such conventional methods, has to be further treated in order to obtain a marketable white product.

A further very serious disadvantage of conventional methods is the relatively low yield. According to conventional methods which require that the vegetable material is comminuted or pressed and the bagasse, i.e., the crushed cell material is then mashed, generally with water and at an elevated temperature, the sugar yield will be only somewhat above 80%. In other words, if the analytically determined sugar content of the vegetable material is 12%, then the yield of white sugar recovered will be about 9.8%. The energy requirements usually are about 4.7 kilowatt hours per kg. of sugar.

This relatively low yield can be explained by the fact that during the mechanical working up of the vegetable material, the sugar juice-containing cells are not completely opened up and thus some of the sugar content of the cells will not be removed. Similar yield problems exist when the removal of sugar from the closed cells is primarily carried out by osmotic process, i.e., by passing dissolved sugar through the cell membranes.

In view thereof, it has been proposed to improve the sugar yield by opening also those vegetable cells which have not been opened during the mechanical comminution of the vegetable material. It has been proposed to burst closed sugar-containing cells by subjecting in a container the vegetable material containing these cells to a steam pressure of between about 60 to 65 atmospheres above atmospheric pressure while maintaining a temperature higher than 150° C. The material is then allowed to escape at great speed through nozzles which are directed against a baffle plate. In other words, the material which is maintained under high pressure and temperature is, so to say, shot through nozzles against the wall of an adjacent container which is maintained at atmospheric pressure. In this manner, it is possible to increase the sugar yield to nearly 90% and to reduce the energy requirements. However, even the last-mentioned process, although giving higher yields than the more classical methods, does not reach optimum yield, inasmuch as there is still a loss of about 10% of sugar, and furthermore, because due to the contact with the heated steam as well as upon subsequent concentration of the liquors, considerable discoloration or darkening of the material will take place.

It is therefore an object of the present invention to overcome the above-discussed difficulties and disadvantages.

It is a further object of the present invention to provide a method for producing sugar from sugar-containing plant material in a higher yield than was heretofore possible.

It is yet another object of the present invention to provide a simple and economical method of recovering from closed-cell vegetable material liquid-soluble constituents which originally were located in the closed cells of the material.

It is still another object of the present invention to provide a method for the production of sugar while substantially preventing discolorization and caramelization of the same.

It is yet a further object of the present invention to provide a method for the recovery of sugar from vegetable material in a high yield and with relatively low energy requirements and a relatively small investment in plant and equipment.

Other objects and advantages of the present invention will become apparent from a further reading of the description and of the appended claims.

With the above and other objects in view, the present invention in one of its broad aspects, is concerned with a process for separating soluble cell content from cellular vegetable material, which process comprises the steps of forming an aqueous suspension of comminuted vegetable material comprising unbroken cells having water-soluble material enclosed therein, the unbroken cells being adapted to burst upon being subjected to a predetermined degree of superatmospheric pressure followed by a sudden release of the superatmospheric pressure, subjecting the suspension at substantially ambient temperature to the predetermined degree of superatmospheric pressure, suddenly releasing the superatmospheric pressure thereby causing bursting of the unbroken cells and contact between the water-soluble material thereof and the liquid phase of the aqueous suspension and solution of the water-soluble material in the liquid phase, and separating the liquid phase having the water-soluble material dissolved therein.

According to a preferred manner of carrying out the process of the present invention, the same comprises a process for producing sugar from sugar-containing vegetable material, which process includes the steps of forming an aqueous suspension of comminuted sugar-containing vegetable material substantially free of gaseous, compressible occlusions comprising unbroken, sugar-containing cells adapted to burst upon being subjected to a predetermined degree of superatmospheric pressure followed by a sudden release of the superatmospheric pressure, subjecting the suspension to ozonization so as to at least substantially sterilize the same, subjecting the thus-sterilized suspension at substantially ambient temperature to the predetermined degree of superatmospheric pressure, suddenly releasing the superatmospheric pressure thereby causing bursting of the unbroken cells and exposure of the sugar content thereof; filtering the thus formed mass at substantially ambient temperature so as to separate the same into a sugar-containing liquid and a solid residue, subjecting the sugar-containing liquid to ozonization so as to at least substantially sterilize the same, subjecting the thus-sterilized sugar-containing liquid to freeze crystallization, and recovering the thus-formed sugar crystals.

The apparatus or arrangement for producing sugar according to the present invention includes an apparatus adapted for treating cellular vegetable material, which apparatus comprises, in combination, a plurality of sequentially arranged vessels adapted to move along an endless path from a first position through a plurality of intermediate positions to a last position and from there back to the first position, inlet and outlet means cooperating with the vessels, respectively, and spaced from each other, for closing and opening, respectively, the vessels, respectively, when the same reach predetermined ones of the positions on the endless path, means for moving the sequentially arranged vessels along the endless path, means cooperating with the vessels, respectively, when the same are in the first position, for temporarily opening the inlet means of the respective vessel, introducing material to be treated into the same and thereafter again closing the inlet means, gas introducing means for introducing into the vessels, respectively, while the same are in any one of the plurality of intermediate positions, a gas under pressure so as to successively increase the pressure in the vessels while the same move through the intermediate positions, withdrawal means cooperating with the vessels, respectively, while the same are in the last position, the withdrawal means including means for introducing into the vessels while the same are, respectively, in the last position, gas under a pressure higher than the pressure in the vessel, means for temporarily opening the outlet means of the vessel thereby establishing communication between the outer atmosphere and the interior of the vessel, blowing out the pressurized contents of the vessel and suddenly reducing the pressure of the contents, and means for closing the vessel after the contents thereof have been blown out and before the vessel reaches the first position, and means, cooperating with the outlet means of the vessels, respectively, when the same are in said last position, for recovering the blown out material.

According to another embodiment of the present invention, the same is concerned with an apparatus for treating cellular vegetable material, which apparatus comprises, in combination, a pressure resistant tubular vessel having at opposite ends thereof inlet and outlet portions, respectively, means for continuously introducing into the tubular vessel through the inlet portion thereof an at least partially liquid material, means for continuously moving the thus introduced material through the outlet portion and electrical means for producing pressure pulses in the material while the same passes from the inlet portion to the outlet portion and including spark gap means arranged within the vessel and adjustable discharge type pulse generator means connected with the spark gap means for producing at controlled time intervals spark discharges across the spark gap means, whereby pressure pulses are produced in the liquid of the material passing through the tubular vessel.

The objects of the present invention are primarily achieved by carrying out the bursting of the cell walls and preferably all steps of the method, particularly also the thickening of the raw sugar juices, without heating of the material. In other words, a cold process is carried out according to the present invention, preferably apart from the freeze drying step at approximately ambient temperature, and the material is worked up in a continuous manner, in a steady flow, without any prolonged intermediate storage or other interruption of the process.

This is achieved, according to the present invention by first comminuting the sugar-containing vegetable raw material by one of said conventional methods, such as slicing, grinding or pressing and by subjecting a suspension of the thus comminuted vegetable material, without any substantial increase in temperature, to relatively high pressure followed by sudden expansion. This may be carried out by subjecting the material only once to relatively high pressure and then suddenly expanding the material, or by subjecting the material to a plurality of sequential pressure pulses, each followed by expansion of the material. If necessary, water is added to the comminuted vegetable material in such an amount that the thus formed suspension will be substantially free of compressible occlusions of gas. The amount of water used for this purpose depends on the type of vegetable material and on the condition thereof. Vegetable material of relatively high water content can be worked up without the addition of water, while in the case of relatively dry, fibrous plants, the addition of water will be required in order to avoid that the pressure impulses will be compensated by compression of gas such as air which is occluded in the thus treated material.

The cold pressure which is required for producing the pressure impulses, may be produced mechanically, for instance by a screw conveyor or a pressure piston, which will permit to compress the material until the required pressure of between about 50 and 60 atmospheres above atmospheric pressure has been reached. However, rather considerable installation and equipment costs would be required for equipment of the above mentioned type.

For this reason, according to the present invention, the pressure impulses are preferably produced by passing the comminuted material to which, if necessary, water has been added, through a plurality of containers which are subjected to pressure by introduction of cold pressurized air or of a cold inert gas. The term "cold" is meant also to include ambient temperatures. The sequentially arranged containers will thus be put under a controlled elevated pressure which will increase in the sequence in which the containers are arranged. The last container in which the highest pressure, namely a pressure of between about 50 to 60 atmospheres or higher is maintained, is then suddenly subjected to a complete pressure release, i.e., the pressure is quickly reduced to atmospheric pressure. Thereby, the pressurized vegetable material in the container will be blown out of the same and simultaneously suddenly expanded, causing bursting of the still closed cells of the cellular vegetable material. Thereafter, this last container is filled with fresh comminuted vegetable material and the pressure therein is successively increased, i.e., first to the lowest overpressure of any of the series of sequentially or successively arranged containers, while the container next following the above-described last container is now subjected to maximum pressure followed by expansion, blowing out of the material and bursting of the cells thereof. The pressure in each of the intermediate containers between the first and last container is simultaneously increased by one pressure step and, in this manner, the pressure is successively increased in all of the successively arranged containers, from the first container in which the raw material is introduced at ambient pressure, to the last container in which maximum pressure is reached and in which the pressure is then suddenly reduced to atmospheric pressure.

All of these containers have outlets so arranged that upon release of the pressure in the container having reached the stage of last container, the suddenly expanded vegetable material blown from the container is collected in a joint collecting vessel or device from which the thus disintegrated material with substantially all cells thereof opened, is then continuously conveyed to the subsequent processing steps. The number of pressure containers, the size of the collecting vessel and the speed with which the disintegrated material is conveyed from the collecting vessel to the next processing step are so adjusted relative to each other that the collecting vessel will always remain partially filled with disintegrated vegetable material consisting substantially completely of broken cells due to the bursting of the previously closed cells upon sudden release of pressure as described above.

Another manner of carrying out the present invention which requires an even lesser investment in apparatus and less energy than the one described above, consists in conveying the comminuted vegetable material to which, if required, water has been added, in a steady stream through a tubular vessel in which the material is subjected to ultrasonic pressure pulses caused by the formation of liquid sparks in the flowing material. Thereby, the pressure pulse effect, i.e., the sudden increase and release of pressure is controlled by the speed of throughflow of the vegetable suspension and/or by changing the spark intensity and/or frequency.

It has been experimentally shown that a tube of firm-resilient synthetic plastic material, for instance polystyrene, or a steel tube provided with an interior coating or layer of such synthetic material will be particularly suitable for carrying out the electrically induced ultrasonic pressure treatment of the material.

The mash-like or mass aqueous vegetable suspension may be introduced into one end of such tube through a screw conveyor and may be withdrawn from the other end of the tube through another screw conveyor. These screw conveyors with the vegetable suspension therein will also serve to form a pressure seal. The material will then be subjected in the center portion of the tube to ultrasonic pressure pulses which are formed by liquid spark discharges in the material. Such liquid sparks and their utilization are well known, for instance for the disinfection of seed grains, the cleaning of milking devices, as well as in communication systems. The liquid sparks are capable, depending on their intensity, of producing within the vessel for very short periods of time pressure impulses of several thousand atmospheres.

It has been found that for the present purpose, with an inner diameter of the tube of about 20 cm., preferably sparks of 4 watt seconds will be utilized which sparks will cause on the surface of a spherical space of about 20 cm. diameter a top or maximum pressure of about 50 atmospheres. These sparks produce exclusively a positive pressure wave. Upon generating a plurality of sparks, the pressure effect is additive. Pressure waves of higher pressure are neither necessary nor desirable for the present purpose because they might lead to a destruction of the vessel or tube. The distance of the individual spark gaps in which sparks are successively formed may be so varied or controlled that the vessel or tube will not suffer any deleterious effect, particularly, if as mentioned above, the wall of the tube possesses somewhat resilient properties.

The frequency of the sparks can be easily adjusted in such a manner that the closed cells of the vegetable material which passes through the tube will be subjected to a plurality of relatively weak sparks which, however, create an additive effect, so that bursting of the cells is assured with certainty. In the case of 10 sparks of 4 watt seconds, the total power requirements equal only about 50 watts. Since the electric energy is converted into pressure impulses substantially without losses, this manner of bursting the cells gives a yield or effectiveness which hardly can be surpassed.

Calculations show that by using a tube of 20 cm. diameter and passing the vegetable material through the tube with a forward speed of 3 meters per second, a total of 350 cubic meters per hour, or within 8 hours about 4000 tons of the material, may be passed through the tube. By arranging 10 spark gaps with a distance of 20 cm. between adjacent spark gaps and causing in each of the spark gaps formation of 10 sparks per second, the material, while passing through a distance of 20 cm. within the tube, will be exposed to be between about 6 and 7 sparks each creating a pressure of about 50 atmospheres. Thus, during such passage, the material will be subjected to an additive pressure of between about 300 and 350 atmospheres which will assure bursting of all of the cell walls of the material.

In accordance with the above figures, namely the passage through the tube of 360 cubic meters or 500 tons of material per hour, the total power requirements will be about 1800 kilowatt hours or only about 3 watt hours per kilogram of crude-sap.

It is noteworthy that each spark of about 4 watt seconds introduces only about one large calorie of heat into the material so that in accordance with the figures suggested above, namely by passing 500 tons of vegetable material per hour through the tubular device and by forming 100 sparks per second, the 500,000 kilograms of material will receive about 360,000 sparks and thus, the temperature of the material will be increased by only somewhat less than 1° C.

It is a further advantage of these liquid sparks that by using suitable electrodes, preferably ceramic electrodes, the introduction of metal into the vegetable suspension is avoided. However, it is also possible to use iron electrodes since the traces of iron which thus will be introduced into the vegetable material are completely insignificant and, in any event, compatible with the subsequent production of a food product.

It is another important advantage which is obtained by causing bursting of the cells by subjecting the same to pressure impulses which are caused by liquid sparks, that during the spark discharge ozone is formed and the thus formed ozone will cause at least substantial sterilization of the vegetable suspension.

At least theoretically, it would also be possible to replace the above described liquid sparks for the formation of ultrasonic pressure pulses by the detonation of explosives, namely so that the explosive pressure is conveyed by way of a membrane through the vegetable suspension. However, such method does not appear to possess any particular advantages and would require highly expensive installations.

The thus treated vegetable material, i.e., a comminuted vegetable material in the form of an aqueous suspension, in which substantially all cells have been ruptured, is then subjected to a series of steps which substantially are known per se. However, according to the present invention, it is proposed that only such method steps be chosen which will not cause heating of the raw sugar juice. The raw sugar juice contained in the suspension of ruptured cells of vegetable material is first separated from solid impurities such as vegetable cell walls and the like in a suitable filtering device, and is then concentrated by a freeze-crystallization process, i.e., concentrated by freezing out water so that a substantial portion of the water of the juice is removed as ice crystals and the residual sugar solution is sufficiently over-saturated to form crystals. The thus precipitated crystals are then separated from the mother liquor by centrifuging and washed. The mother liquor is freed of non-sugar impurities, particularly salts by being passed through a conventional ion exchange device and the thus purified mother liquor is then reintroduced into the crystallizing process. Here again, all of these method steps are proposed to be carried out without causing increase in the temperature of the sugar juices or liquors, and in a continuous manner. Sometimes it will be desirable to sterilize either the raw juice obtained after the centrifuging of the material, or the mother liquor after salts have been removed therefrom, by subjecting the respective more or less concentrated sugar syrups or juices to ozonization either in a conventional manner known to those skilled in the art, or in a very simple manner by forming in the juice a few liquid sparks in the manner described above. Various devices for carrying out these method steps are commercially available and well known to those skilled in the art.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
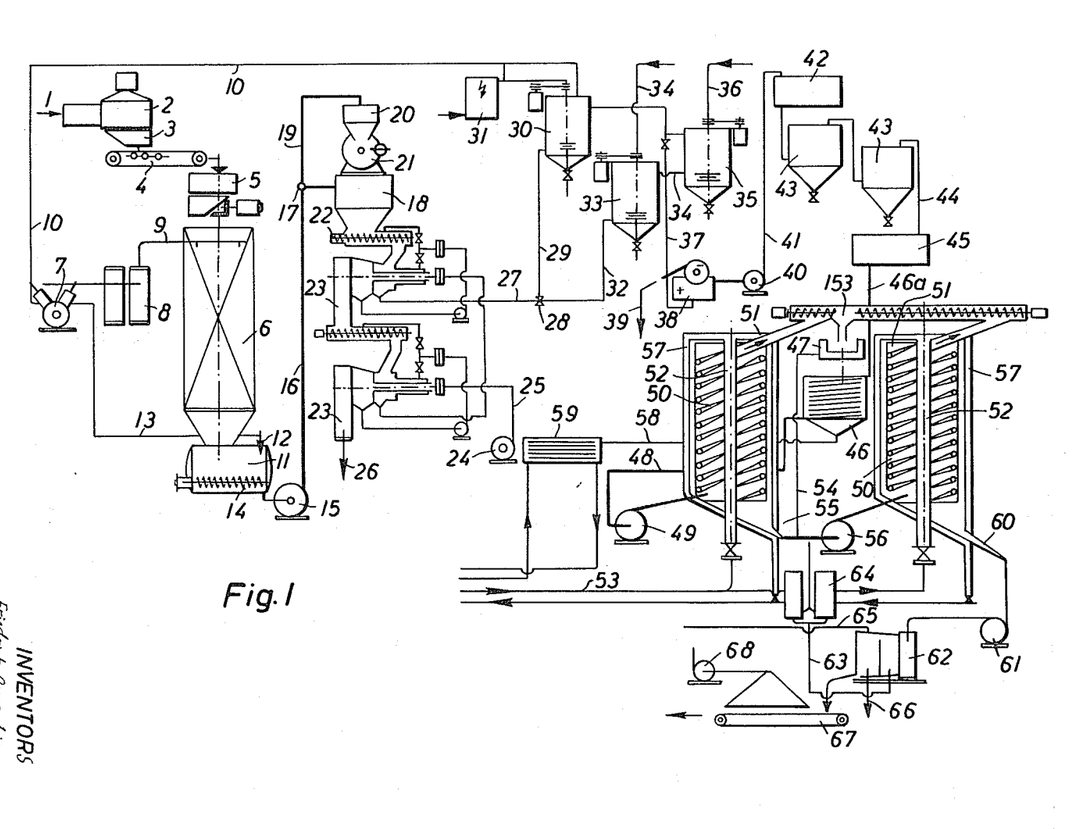
FIG. 1 is a schematic elevational view of an arrangement for carrying out the process of the present invention.

Referring now to the drawing and particularly to FIG. 1, it will be seen that the process of the present invention may be carried out in the following manner:

The conventionally cleaned sugar-containing plants or plant portions are introduced through inlet 1 into a comminuting device 2, which, depending on the type of vegetable raw material, may be a conventional rasp, slicing machine or crusher.

The thus formed comminuted material passes through funnel 3 onto conveyor scale 4 and from there to a filling device 5 which introduces the comminuted and weighed material in controlled quantities, or at a controlled rate, into a device 6 which serves for bursting the cells of the comminuted material. Details of the construction of device 6 as used in the presently illustrated embodiment will become apparent from the description of FIGS. 2–5 of the drawing.

The rate of production of comminuting device 2 is adjusted to the rate at which material can be processed in device 6, preferably by an electric control actuated by conveyor scale 6. Compressor 7 and pressure container 8 serve for passing through conduit 9 compressed gas required for operation of device 6 into the latter. If the compressed gas which is to be introduced into device 6 consists of air, it is desirable to sterilize the same with ozone which may be introduced into pressure container 8 through conduit 10.

In device 6, the comminuted vegetable material is subjected to high pressure and sudden release of pressure and thereby the cells of the vegetable material are ruptured. The thus disintegrated material is blown in the form of pulp from device 6 into container 11 which is maintained at atmospheric pressure. Gas under pressure introduced from device 6 is released through valve 12 and returned through conduit 13 to compressor 7. Screw conveyor 14 passes the pulp of broken cells to pump 15 and from there through conduit 16 and three-way valve 7 either into intermediate container 18; namely, in case the raw material consisted of sugar beets or fruits, or, if the pulp was formed of sugar cane, then the pulp must first pass through conduit 19 and container 20 to disintegrator 21 for breaking up any knots of sugar cane which may still be present in the pulp. From disintegrator 21, the sugar cane pulp passes then into intermediate container 18. Screw conveyor 22 passes the pulp from intermediate container 18 to washing device 23 in which the pulp is washed in several steps in countercurrent with water introduced through pump 24 and conduit 25, so that substantially all of the sugar is removed from the pulp and an aqueous sugar solution is formed, while a substantially sugar-free pulp remains.

The washed, substantially sugar-free pulp leaves the washing device at outlet 26 while the sugar-containing solution which has been concentrated by being produced in countercurrent flow between pulp and wash water, passes either through conduit 27 and three-way valve 28 or through conduit 29 into container 30 in which ozone derived from ozone-producing device 31 is introduced into the solution. The ozone is intimately mixed with the solution by means of special stirring equipment known per se to those skilled in the art. Alternatingly, the solution may also be passed through conduit 32 into container 33 in which a carefully controlled amount of lime milk derived from conduit 34 is stirred into the solution. The mixture of concentrated sugar solution and lime milk from container 33 passes through conduit 34 in container 35. Aluminum sulfate solution is introduced into container 35 through conduit 36 and stirred with the other contents of container 35. In this manner, the lime added in container 33 and all other slime or turbidity causing materials are precipitated.

If purification has been carried out with ozone, then the turbid solution passes through conduit 37 to electrophoresis device 38. Through the same conduit, the lime treated and aluminum sulfate precipitated solution from container 35 is passed to electrophoresis 38. In the conventional electrophoresis device 38, coarse impurities are precipitated and removed at 39. Pump 40 passes the thus precleaned solution through conduit 41 into container 42. From container 42, the solution flows to and through filter device 43 in order to be completely cleared, and from there through conduit 44 into container 45. From container 45, the cleaned solution passes through conduit 45a into heat exchanger 46 in which the solution is cooled down to a temperature of $+1°$ C. by means of ice derived from centrifuge 47.

The thus cooled solution is passed through conduit 48 by means of pump 49 in an upward tangential direction into sieve screen 50 of container 51 in which, through a centrally arranged riser 52 and the hollow helical conduit of the sieve screen 50, refrigerating liquid is passed which is obtained from refrigerating device 53. The refrigerating liquid is at a sufficiently low temperature to form, by indirect heat exchange, ice in the sugar solution. The thus formed ice, is removed from the solution due to the tangential upwardly increasing velocity and is passed by way of screw conveyor 153 to centrifuge 47. In centrifuge 47 sugar-containing mother liquor is separated from the ice and the separated mother liquor is passed through conduit 54 into the concentrated solution which leaves the refrigerating device at outlet 55.

In a somewhat similar manner, pump 56 pumps the thus concentrated solution through a second refrigeration device which operates similar to the above-described first refrigeration device and is indicated by the same reference numerals. The refrigerating liquid returns through jacket 57 into refrigerating device 53. Water formed by melting of some of the ice passes through conduit 58 and heat exchanger 59 back to washing device 26.

The suspension of sugar crystals and mother liquor which leaves the second refrigeration device at outlet 60 is passed through pump 61 into centrifuge 62. Mother liquor separated in centrifuge 62 from the sugar crystals passes through conduit 63 to ion-exchanger 64 and from there to pump 56. In the second stage of centrifuge 62, the sugar crystals are washed with alcohol, the latter being introduced through conduit 65 and leaving the centrifuge through outlet 66 for regeneration and reuse.

The sugar crystals which are separated in the centrifuge drop onto conveyor belt 67, alcohol vapors are sucked off by means of exhausts or fans 68 and are recovered. The thus obtained dry sugar crystals are then packaged in conventional manner.

It will be noted that according to the process as described hereinabove, the vegetable material which is to be treated and the sugar syrups formed thereof are substantially completely protected from the access of air and contamination which might be connected therewith, furthermore, that the process is carried out in a single continuous flow from the introduction of the comminuted vegetable material to the recovery of the sugar crystals and that the separation of the sugar-containing liquid from the ruptured cells of the vegetable material is carried out by washing the suspension as it is formed in device 6 with cold water which flows in countercurrent to the suspension.

Referring now to the embodiment of device 6 for bursting the cells of the vegetable material which is illustrated in FIGS. 2–5, it will be seen that six upright pressure cylinders 72 are arranged along a circular path within container 71. Each of the cylinders 72 has at its upper end an inlet 73 and at its lower end an outlet 74. Inlets 73 and outlets 74 may be pressure-tightly closed by quick acting valves 73' and 74'.

Accurately measured quantities of the comminuted vegetable material are introduced into funnel 76 by means of conveyor scale 75.

Figure 4:
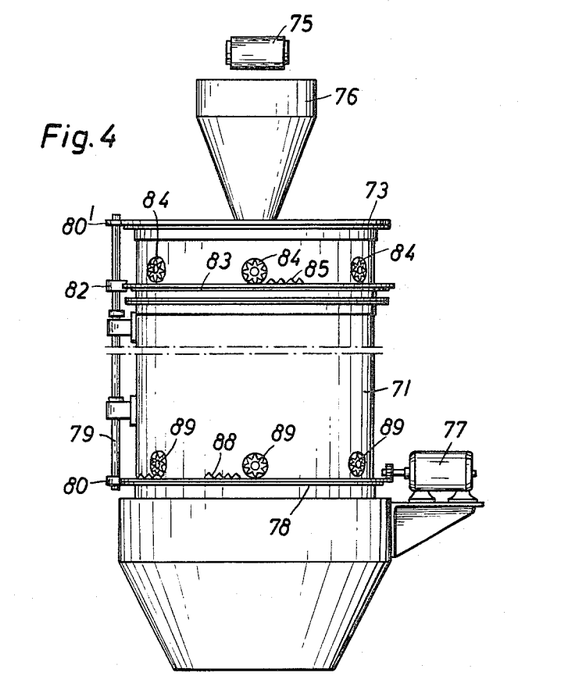
FIG. 4 is another elevational view of the same embodiment taken at a right angle to the showing of FIG. 2.
Figure 5:
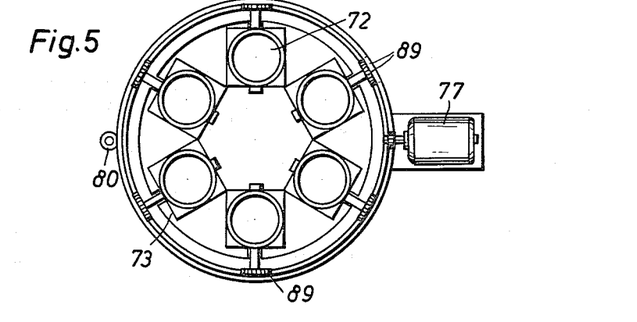
FIG. 5 is a diagrammatic plan view of the device illustrated in FIG. 4.

As shown in FIG. 4, intermittently or periodically operating electric motor 77 drives toothed wheel 78 and the latter by means of toothed wheels 80 turns upright shaft 79 about its axis and thereby, by means of toothed wheel 80' causes rotating of toothed disc plate 81 about its axis. The direction of movement of these cooperating members remains the same and the intermittent operation of electric motor 77 is so adjusted that feeding funnel 76 will remain stationary for short periods of time over the inlet opening of each of the six pressure cylinders, respectively. While funnel 76 is located above the inlet opening of any one of the six pressure cylinders, the pressure type closure 73 of the respective inlet opening is opened so that the comminuted material may drop from funnel 76 into the respective pressure cylinder. Closure 73 is opened by means of toothed rim 83 which is driven by upright shaft 79 and toothed wheel 82. Toothed wheels 84 coact with teeth 85 of toothed rim 83. Simultaneously, funnel 76 is filled with comminuted vegetable material by means of conveyor scale 75. Due to turning of toothed rim 83, the toothed portion 85 thereof moves out of contact with the respective toothed wheel 84 and thereby the pressure tight closure 73 of the first pressure cylinder which now has been filled with comminuted vegetable material is again placed into closed position and the above described movements are repeated with respect to the next following pressure cylinder, starting with opening of the pressure tight closure 73 of the inlet opening thereof. In this manner, sequentially, the six pressure cylinders illustrated in the drawing are filled and after filling of the six cylinders, the process is repeated starting again with filling of the first pressure cylinder which, in the meantime, has been emptied of the vegetable material previously introduced into the same.

After the first pressure cylinder has been filled with vegetable material, compressed air or a compressed inert gas is introduced into the same, as diagrammatically shown, through conduit 86. The pressure in the cylinders is increased consecutively from the first to the sixth cylinder by introducing successively additional compressed gas into the same, preferably so that the pressure increases in equal increments between any two cylinders in the direction from the cylinder in position 1 to the cylinder in position 6. Thus, for instance, after filling the fifth pressure cylinder with vegetable material, the same is subjected to the first introduction of gas under pressure and thus the pressure in cylinder 5 will be raised to about one-fifth of the pressure which in the meantime has been reached in the first pressure cylinder.

While cylinder 6 is being filled with vegetable material, pressure in excess of the pressure which can be supplied through conduit 86 is introduced through conduit 87 into the first pressure cylinder, whereupon the pressure-tight closure of the lower outlet 74 of the first cylinder is opened by actuating toothed wheels 89 which coact with teeth 88 of toothed rim 78. Cylinder 1 which now has reached the highest pressure of the entire process, upon opening of the outlet thereof will suddenly be exposed to ambient pressure and this pressure release will cause sudden discharge of the vegetable material from cylinder 1. The vegetable material is thus blown into receptacle 90 and pushed against grating 91. Most of the closed cells of the vegetable material will burst due to the sudden release of pressure and the internal friction between portions of the cellular material during the discharge of the same from the pressure cylinder. Any cells which still might be closed cells will be broken when the material hits bar grate 91.

Figures 2, 3:
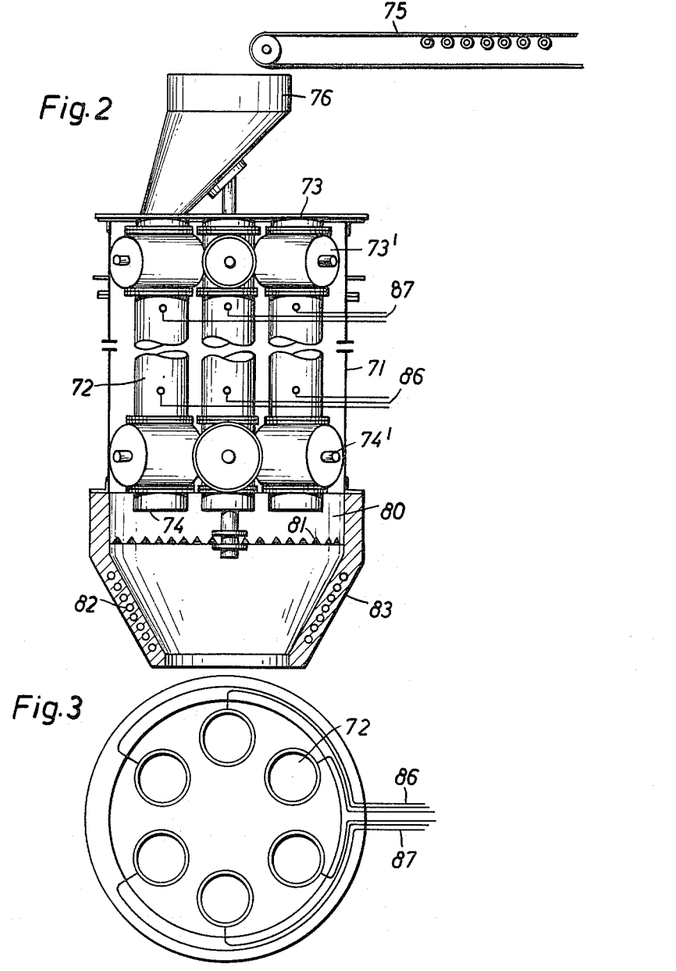
FIG. 2 is a diagrammatic, fragmentary elevational view, partially in cross section of an embodiment of an apparatus suitable for subjecting the vegetable material to increased pressure and sudden pressure release.
FIG. 3 is a diagrammatic plan view of the device shown in FIG. 2.

Receptacle 90, as shown in FIG. 2, is formed of insulating wall 93 in which coils 92 are embedded so that cooling or heating fluid may be passed through the same if required in order to control the temperature of the open-cell vegetable material which will reach the portion of receptacle 90 located below grate 91.

In this manner, each of the six pressure cylinders 72 assumes successively the positions 1 through 6 as described above, being filled in position 1, whereupon the gas pressure therein is progressively increased through the positions 2–5, followed by the further increase in gas pressure when the respective pressure cylinder assumes position 6, whereupon the lower closure of the pressure cylinder in position 6 is opened and the vegetable material blown out of the cylinder under simultaneous release of pressure. Thereafter, the respective pressure cylinder assumes again position 1, i.e., is filled with a subsequent portion of the comminuted vegetable material.

While some of the connections and conduits are shown in FIGS. 2–5 only diagrammatically, it is to be understood that these individual elements of the structure are well known, such as conventional connections and conduits for transmitting gas under pressure from a stationary inlet to a moving or rotating member.

Figure 6:
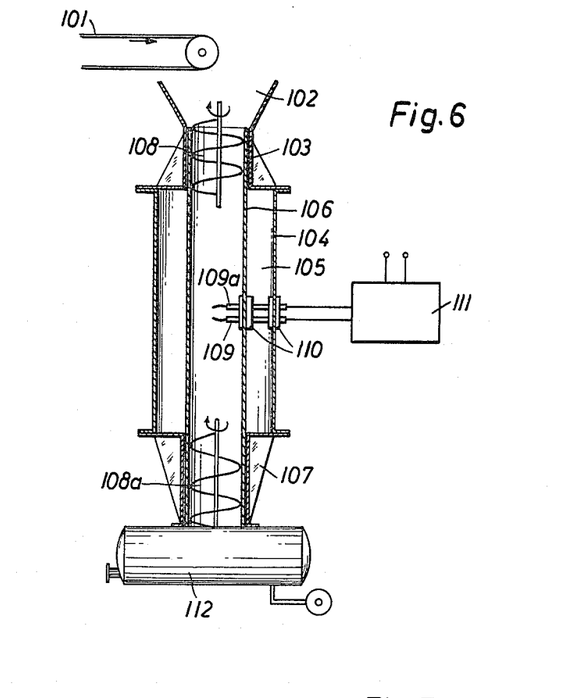
FIG. 6 is a schematic elevational view partially in cross section of another embodiment of a device for producing pressure pulses in the vegetable material.
Figure 7:
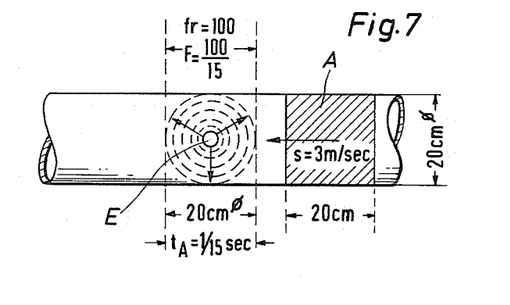
FIG. 7 is a fragmentary diagrammatic view of the embodiment of FIG. 6 which will serve to further explain the process carried out therein.

According to FIGS. 6 and 7, the device 6 of FIG. 1 is replaced with an apparatus for bursting the cells of the cellular material by subjecting the same to wet spark discharges and pressure pulses created thereby.

Referring first to FIG. 6, container 104 corresponds to schematically illustrated container 6 of FIG. 1. Container 104 comprises a tubular member 106 formed of hard-resilient synthetic material such as polystyrene, or of a tube formed of thin steel sheet and covered at its inner face with such synthetic-resilient plastic material. An outer sleeve or mantle 104 surrounds tube 106 in airtight manner, and is firmly connected to tube 106 by means of frustoconical portions 103 and 107. The air filled space 105 between tubes 106 and 104 serves as a pressure cushion for the inner tube 106. The comminuted vegetable material including closed cells passes by way of moving belt 101 into funnel 102 and is then moved therefrom by means of screw conveyor 108 into the inlet portion of tube 106. Screw conveyor 108a serves for withdrawing the material from the outlet portion of tube 106, and from there the vegetable material, i.e., the mass which has been introduced into tube 106 and which has been subjected to bursting of the cells while therein, passes into tank 112 which is maintained at ambient pressure. The rotational speed of screw conveyor 108a is equal to or somewhat smaller than that of screw conveyor 108 so that the portion of tube 6 located between screw conveyors 108 and 108a will be completely filled with the vegetable pulp at all times.

About half way between the two screw conveyors or end portions of tube 106, electrodes 109 and 109a are arranged attached to electric conduits which pass through insulated lead-ins which are pressure-tight arranged in the walls of tubes 106 and 104. An adjustable generator 111 is provided from which by suitable adjustment of self-induction and capacity the expansion of the spark in the discharge-type spark gap circuit can be adjusted. This is a conventional discharge type impulse generator for producing spark discharges between the electrodes 109 and 109a and it is possible, by means thereof, to control the intensity as well as the frequency and length of the individual sparks and pressure pulses. On the other hand, it is possible to control and adjust the speed of conveyor belt 101 as well as the rotational speed of screw conveyors 108 and 108a, and thus the speed of passage of the vegetable pulp through tube 106.

The operation of the device illustrated in FIG. 6 will now be exemplified with reference to FIGS. 6 and 7.

Assuming a diameter of tube 106 equal to 20 cm., the cross sectional area of the tube will be 310 cm.² By passing the vegetable pulp through pipe 106 at a speed of 3 meters per second, 0.93 m.³ of the pulp will be passed through the tube during each second, or 350 cubic meters per hour which, assuming a specific weight or gravity of the pulp of 1.4, equals 500 tons per hour.

As illustrated in FIG. 7, the spark electrodes E are arranged in the center of the cross sectional area of tube 106 and thus at a distance of half the diameter of the tube, or of 10 cm. from the inner wall of the tube. Since the detonation of the spark discharge expands in the form of an expanding sphere, a pressure sphere having a diameter of 20 cm. is formed as indicated in dotted lines.

Considering now a portion A of the pulp flowing through the discharge pipe, it will be understood that this portion A forms a cylindrical plug having a length of 20 cm. and a diameter of 20 cm. The speed of forward movement of the plug is assumed to be 3 meters per second. In order to pass completely through the pressure sphere produced by the spark discharge, the plug has to move a distance of $2 \times 20$ cm. or 40 cm. in axial direction of the tube. Under the above assumed conditions, the time required for such movement equals 0.133 second.

Assuming that a spark frequency of 100 is chosen, about 7 spark discharges will take place within the 0.133 second.

It has been experimentally proven, and is well known, that a liquid spark of 4 watt seconds will cause at a distance of 10 cm. a pressure of 50 atmospheres above atmospheric pressure. Since plug A moves during the 7 discharges for a distance of 40 cm., i.e., twice the diameter of the sphere, only about half of the pressure waves will be fully effective and it must be considered thereby that the pressure drops with the square of the distance. Furthermore, it must be considered that a portion of the spark energy will be absorbed by the resilient wall of tube 106. Since, on the other hand, the pressure waves have an additive effect, each particle of the vegetable pulp passing through the spark area theoretically will be exposed to a pressure of about $3.5 \times 50$, equal to about 185 atmospheres above atmospheric pressure. Experiments have shown that in actual practice the pressure will be somewhere between above 140 and 150 atmospheres. This pressure is applied to the still closed cells while the same pass through the spark-forming portion of the tube. Since the pressure increase up to about 150 atmospheres takes place in a stepwise manner, depending on the number of sparks, only relatively few cells are caused to burst or be destroyed thereby.

The length of tube 106 from electrodes 109 and 109a to vessel or tank 112, the latter being maintained at ambient pressure, will equal about three times the diameter of tube 106 or about 60 cm. Through this portion of the tube, i.e., the portion from the spark discharge area to the end of the tube, the material will flow at a speed of 3 meters per second or in about 0.2 second. In other words, the pressure applied to the vegetable pulp drops in one-fifth of a second from 150 atmospheres over-pressure to ambient pressure. Thereby, practically all of the cells are caused to burst by release of the over-pressure.

The above mentioned dimensions and quantitative data have been found to be particularly suitable, however, the invention obviously is not limited to these specific details. The required quantitative data can be easily calculated in the manner described above. However, it is important to arrange for a speed of forward movement of the material corresponding to the desired amount of material to be treated per unit of time, and to choose tube diameter, spark intensity and spark frequency in accordance therewith.

With respect to calculation of spark intensity, etc., reference is made to the articles which appeared in "Zeitschrift fuer angewandte Physik," volume 9, pages 145–47 (1957), and "Zeitschrift fuer Optik," 3rd issue 1948, page 124, as well as German Patents 1,081,-608 and 1,065,985.

It will be understood from the foregoing description of the invention that the tearing of the cell walls or the bursting of the cells is accomplished at ambient temperature. This feature is important and appears to be novel since all conventional methods known to applicants carry out the destruction of the cells at elevated temperature, for instance by means of steam. Opening of the cells at such substantially elevated temperatures is connected with two serious disadvantages, namely a certain degree of caramelization of the raw or crude juices, so that the initially formed sugar is discolored and must be refined, and so that during hot destruction of the cells the vitamins, particularly vitamins of the B complex which are contained in the vegetable material as well as certain trace elements, are destroyed or transformed into useless compounds. Thus, the conventionally produced sugar consists substantially only of the pure carbohydrate without containing any vitamins, trace elements or the like. In contrast thereto, it is possible according to the present invention to produce a white sugar which still contains a substantial proportion of the vitamins and trace elements of the original vegetable material. Furthermore, due to carrying out the entire process at ambient temperature, the sugar juices remain clear and transparent so that white sugar can be directly produced therefrom without requiring the conventional refining of raw sugar.

Another important feature of the present invention, or at least of preferred embodiments thereof, is the ozonization of the sugar-carrying materials and juices which may be carried out once or several times during the present process. Preferably, ozonization is carried out by means of a hollow tube known for this purpose per se, in other words, by means of a device which will cause stirring of the suspension or solution while simultaneously ozone is blown into the same through the hollow tube or shaft. Due to the fact that from the comminution of the vegetable material on and up to centrifuging of the finished sugar, the material does not contact the outer atmosphere, any sterilization achieved by ozonization will remain effective throughout the entire process.

The method of the present invention is equally suitable for working up sugar cane, sugar beets, dates, grapes, particularly late-gathered grapes and raisins. All of the vegetable raw materials are first comminuted in substantially the same manner, namely either by being passed through a rasp or a very fine slicing machine. It is desired that during such comminution at the beginning of the process a large portion of the cells are broken or ruptured. The process of the present invention does not employ osmotic principles. To the contrary, the individual cells are completely ruptured in a device such as is schematically indicated by reference numerals 6 in FIG. 1 and shown in more detail in FIGS. 2–7.

After the first comminution of the material in a slicer, rasp or the like, which to some extent must be adapted to the specific type of vegetable material, the treatment of the thus formed suspension will be the same, irrespective of the type of vegetable material. It is immaterial for the process of the present invention, after first comminution of the vegetable material, what type of plants or plant portions have been subjected to such comminution. The only adjustment that has to be made is in the addition of water, which may be required, depending on the water content of the originally comminuted vegetable material. In the average, water is to be added in an amount equal to about one half of the weight of the respective sugar-carrying roots or fruits which are to be processed. This water is introduced before the vegetable mass enters device 6 of FIG. 1. Later, so much water accrues that in fact there is an excess of water in the process. The figure mentioned above for the addition of water, namely about 50% of the weight of the vegetable material will vary depending on the moisture content of the vegetable material such as roots, i.e., beets or fruits, i.e., raisins or dates, by about plus or minus 20%.

With respect to the pressure which is required for subsequent rupturing of the cells by release of such pressure, it has been found that it suffices to let the pressure rise slowly or stepwise, for instance in the apparatus illustration in FIGS. 2–5 to a maximum pressure of about 50 atmospheres above atmospheric pressure, and thereafter to quickly release the over-pressure. It is more advantageous to operate with even higher pressures than 50 atmospheres. The upper limit of pressure will be determined by economic considerations with respect to the cost of producing the compressed gas or air and with respect to the pressure stability of the equipment.

For practical purposes, it has been found advantageous to operate with equipment of the type illustrated in FIGS. 2–5 at pressures of about 60 atmospheres and with equipment of the type illustrated in FIGS. 6 and 7 with pressures of about 150 atmospheres.

Thus it may be stated that the present invention comprises a method for obtaining marketable white sugar from sugar-containing plants, as well as a method of working up similar materials of organic origin, wherein the vegetable material or the like is first comminuted and thereafter the still closed cells of the comminuted material are caused to burst by application of high pressure followed by quick release of the pressure, and wherein all of the steps of the method and particularly the bursting of the cell walls and the thickening of the raw or crude sugar-containing juice are carried out without application of heat in a fully continuous manner.

According to one of the described embodiments of the present invention, the pressure impulses are produced by liquid spark discharges.

According to another embodiment of the present invention, the pressure is produced by stepwise introduction of a suitable compressed gas into closed pressure cylinders which contain the vegetable material.

In either case, if the water content of the originally comminuted material does not suffice to eliminate the occlusion of gas in the pulp, it is proposed to add water so that the pulp when subjected to the pressure increase will not contain any compressible gas pockets. The pulp, after the bursting of substantially all of the cells thereof, is then filtered so as to obtain a raw or crude sugar-containing juice which is then concentrated to the point of crystal formation in a freeze crystallizing or freeze-drying process i.e., again without increasing the temperature of the material but, to the contrary, by temporarily substantially reducing the temperature of the treated mass. The thus formed crystals are then separated from the mother liquor by centrifuging, washed and recovered as marketable sugar, while the mother liquor is purified by being subjected to ion-exchange and thereafter recycled into the crystallization process.

Finally, it is once more pointed out that, the present invention also proposes to subject the material once or several times during the process, i.e., after comminution and prior to separation of the crystals, to ozonization, in order to at least substantially sterilize the material. Due to the fact that substantially the entire process is carried out in closed vessels and conduits, the sterilized material will be protected from contamination, for instance by contact with the outside atmosphere.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process for producing sugar from sugar-containing vegetable material, comprising the steps of comminuting sugar-containing vegetable material so as to form a mass of vegetable particles comprising unbroken, sugar-containing cells adapted to burst upon being subjected to a predetermined degree of superatmospheric pressure followed by a sudden release of said superatmospheric pressure; subjecting said mass of vegetable particles to a series of liquid sparks so as to subject said mass to a series of cumulative ultrasonic pressure increases reaching said predetermined degree of superatmospheric pressure; suddenly releasing said superatmospheric pressure thereby causing bursting of said unbroken cells and exposure of the sugar content thereof; and separating the thus formed mass into a sugar-containing liquid and solid constituents.

2. A process for producing sugar from sugar-containing vegetable material, comprising the steps of forming an aqueous suspension of comminuted sugar-containing vegetable material comprising unbroken, sugar-containing cells adapted to burst upon being subjected to a predetermined degree of superatmospheric pressure followed by a sudden release of said superatmospheric pressure; subjecting said suspension at substantially ambient temperature to a series of liquid sparks so as to subject said suspension to a series of cumulative ultrasonic pressure increases reaching said predetermined degree of superatmospheric pressure; suddenly releasing said superatmospheric pressure thereby causing bursting of said unbroken cells and exposure of the sugar content thereof; separating at substantially ambient temperature the thus formed mass into a sugar-containing liquid and solid constituents; and working up said sugar-containing liquid to form therein and to separate therefrom sugar crystals substantially without exposing said liquid and said crystals to temperatures above ambient temperature.

3. A process for producing sugar from sugar-containing vegetable material, comprising the steps of forming an aqueous suspension of comminuted sugar-containing vegetable material substantially free of gaseous, compressible occlusions comprising unbroken, sugar-containing cells adapted to burst upon being subjected to a predetermined degree of superatmospheric pressure followed by a sudden release of said superatmospheric pressure; subjecting said suspension at substantially ambient temperature to a series of liquid sparks so as to subject said suspension to a series of cumulative ultrasonic pressure increases reaching said predetermined degree of superatmospheric pressure and followed by at least a substantial release of said superatmospheric pressure thereby causing bursting of said unbroken cells and exposure of the sugar content thereof; separating at substantially ambient temperature the thus formed mass into a sugar-containing liquid and solid constituents; and working up said sugar-containing liquid to form therein and to separate therefrom sugar crystals substantially without exposing said liquid and said crystals to temperatures above ambient temperature.

4. A process for producing sugar from sugar-containing vegetable material, comprising the steps of forming an aqueous suspension of comminuted sugar-containing vegetable material substantially free of gaseous, compressible occlusions comprising unbroken, sugar-containing cells adapted to burst upon being subjected to a predetermined degree of superatmospheric pressure followed by a sudden release of said superatmospheric pressure; passing said suspension at substantially ambient temperature through a tubular conduit, said suspension substantially completely filling said conduit; subjecting said suspension while passing through said conduit to a plurality of electrically induced successive cumulative ultrasonic pressure shocks reaching said predetermined degree of superatmospheric pressure; releasing said superatmospheric pressure thereby causing bursting of said unbroken cells and exposure of the sugar content thereof; separating at substantially ambient temperature the thus formed mass into a sugar-containing liquid and solid constituents; and working up said sugar-containing liquid to form therein and to separate therefrom sugar crystals substantially without exposing said liquid and said crystals to temperatures above ambient temperature.

5. A process for producing sugar from sugar containing vegetable material, comprising the steps of forming an aqueous suspension of comminuted sugar-containing vegetable material substantially free of gaseous, compressible occlusions comprising unbroken, sugar-containing cells adapted to burst upon being subjected to a predetermined degree of superatmospheric pressure followed by a sudden release of said superatmospheric pressure; passing said suspension at substantially ambient temperature through a tubular conduit, said suspension substantially completely filling said conduit, subjecting said suspension while passing through said conduit to a plurality of electrically induced successive cumulative ultrasonic pressure shocks reaching a pressure of above 150 atmospheres being at least equal to said predetermined degree of superatmospheric pressure; suddenly releasing said superatmospheric pressure thereby causing bursting of said unbroken cells and exposure of the sugar content thereof; separating at substantially ambient temperature the thus formed mass into a sugar-containing liquid and solid constituents; and working-up said sugar-containing liquid to form therein and to separate therefrom sugar crystals substantially without exposing said liquid and said crystals to temperatures above ambient temperature.

6. A process for producing sugar from sugar-containing vegetable material, comprising the steps of forming an aqueous suspension of comminuted sugar-containing vegetable material substantially free of gaseous, compressible occlusions comprising unbroken, sugar-containing cells adapted to burst upon being subjected to a predetermined degree of superatmospheric pressure followed by a sudden release of said superatmospheric pressure; subjecting said suspension at substantially ambient temperature to a series of liquid sparks so as to subject said suspension to a series of cumulative ultrasonic pressure increases reaching said predetermined degree of superatmospheric pressure; suddenly releasing said superatmospheric pressure thereby causing bursting of said unbroken cells and exposure of the sugar content thereof; filtering the thus formed mass at substantially ambient temperature so as to separate the same into a sugar-containing liquid and a solid residue; subjecting said sugar-containing liquid to freeze crystallization; and recovering the thus-formed sugar crystals.

7. A process for producing sugar from sugar-containing vegetable material, comprising the steps of forming an aqueous suspension of comminuted sugar-containing vegetable material substantially free of gaseous, compressible occlusions comprising unbroken, sugar-containing cells adapted to burst upon being subjected to a predetermined degree of superatmospheric pressure followed by a sudden release of said superatmospheric pressure; subjecting said suspension at substantially ambient temperature to a series of liquid sparks so as to subject said suspension to a series of cumulative ultrasonic pressure increases reaching said predetermined degree of superatmospheric pressure; suddenly releasing said superatmospheric pressure thereby causing bursting of said unbroken cells and exposure of the sugar content thereof; filtering the thus formed mass at substantially ambient temperature so as to separate the same into a sugar-containing liquid and a solid residue; subjecting said sugar-containing liquid to freeze crystallization so as to form a suspension of sugar crystals in a mother liquor; centrifuging said suspension so as to separate said sugar crystals from said mother liquor; subjecting the thus separated mother liquor to ion exchange so as to remove dissolved non-sugar constituents therefrom; and subjecting the thus purified mother liquor to freeze crystallization to recover sugar crystals therefrom, without during the entire process defined herein raising the temperature substantially above ambient temperature.

8. A process for producing sugar from sugar-containing vegetable material, comprising the steps of forming an aqueous suspension of comminuted sugar-containing vegetable material substantially free of gaseous, compressible occlusions comprising unbroken, sugar-containing cells adapted to burst upon being subjected to a predetermined degree of superatmospheric pressure followed by a sudden release of said superatmospheric pressure; subjecting said suspension to ozonization so as to at least substantially sterilize the same; subjecting the thus-sterilized suspension at substantially ambient temperature to a series of liquid sparks so as to subject said suspension to a series of cumulative ultrasonic pressure increases reaching said predetermined degree of superatmospheric pressure; suddenly releasing said superatmospheric pressure thereby causing bursting of said unbroken cells and exposure of the sugar content thereof; separating at substantially ambient temperature the thus formed mass into a sugar-containing liquid and solid constituents; and working up said sugar-containing liquid to form therein and to separate therefrom sugar crystals substantially without exposing said liquid and said crystals to temperatures above ambient temperature.

9. A process for producing sugar from sugar-containing vegetable material, comprising the steps of forming an aqueous suspension of comminuted sugar-containing vegetable material substantially free of gaseous, compressible occlusions comprising unbroken, sugar-containing cells adapted to burst upon being subjected to a predetermined degree of superatmospheric pressure followed by a sudden release of said superatmospheric pressure; subjecting said suspension at substantially ambient temperature to a series of liquid sparks so as to subject said suspension to a series of cumulative ultrasonic pressure increases reaching said predetermined degree of superatmospheric pressure; suddenly releasing said superatmospheric pressure thereby causing bursting of said unbroken cells and exposure of the sugar content thereof; filtering the thus formed mass at substantially ambient temperature so as to separate the same into a sugar-containing liquid and a solid residue; subjecting said sugar-containing liquid to ozonization so as to at least substantially sterilize the same; subjecting the thus-sterilized sugar-containing liquid to freeze crystallization; and recovering the thus-formed sugar crystals.

10. A process for producing sugar from sugar-containing vegetable material, comprising the steps of forming an aqueous suspension of comminuted sugar-containing vegetable material comprising unbroken, sugar-containing cells adapted to burst upon being subjected to a predetermined degree of superatmospheric pressure followed by a sudden release of said superatmospheric pressure; subjecting said suspension at substantially ambient temperature to a series of liquid sparks so as to subject said suspension to a series of cumulative ultrasonic pressure increases reaching said predetermined degree of superatmospheric pressure; suddenly releasing said superatmospheric pressure thereby causing bursting of said unbroken cells and exposure of the sugar content thereof; separating the thus formed mass into a sugar-containing liquid and solid constituents; and working up said sugar-containing liquid to form and recover sugar crystals therefrom.

11. In a process for separating soluble cell content from cellular vegetable material, the steps of forming an aqueous suspension of comminuted vegetable material comprising unbroken cells having water-soluble material enclosed therein, said unbroken cells being adapted to burst upon being subjected to a predetermined degree of superatmospheric pressure followed by a sudden release of said superatmospheric pressure; subjecting said suspension at substantially ambient temperature to a series of liquid sparks so as to subject said suspension to a series of cumulative ultrasonic pressure increases reaching said predetermined degree of superatmospheric pressure; suddenly releasing said superatmospheric pressure thereby causing bursting of said unbroken cells and contact between the water-soluble material thereof and the liquid phase of said aqueous suspension and solution of said water-soluble material in said liquid phase; and separating said liquid phase having said water-soluble material dissolved therein.

References Cited by the Examiner
UNITED STATES PATENTS

| | | | |
|---|---|---|---|
| 940,644 | 11/1909 | Monti | 62—124 |
| 1,442,304 | 1/1923 | Spencer et al. | 241—1 X |
| 1,888,419 | 11/1932 | Ainsworth | 204—165 |
| 2,036,818 | 4/1936 | Meredith et al. | 127—2 |
| 2,807,560 | 9/1957 | Brownell et al. | 127—43 |
| 2,818,358 | 12/1957 | Brownell et al. | 127—43 |
| 2,873,220 | 2/1959 | Brownell et al. | 127—4 |

MORRIS O. WOLK, *Primary Examiner.*